Oct. 29, 1968 J. W. HEALY 3,408,641

LATCHING MEANS FOR AUTOMATIC TELEPHONE DIALER

Original Filed Oct. 29, 1962

INVENTOR.
JAMES W. HEALY
BY
Fryer & Tjensvold
ATTORNEYS 3,408,641

LATCHING MEANS FOR AUTOMATIC TELEPHONE DIALER

James W. Healy, Wakefield, Mass., assignor to Dasa Corporation, a corporation of California Continuation of application Ser. No. 233,601, Oct. 29, 1962. This application Oct. 31, 1966, Ser. No. 595,298
3 Claims. (Cl. 340—174.1)

ABSTRACT OF THE DISCLOSURE

For use in an automatic telephone dialer in which a repertory of names and associated telephone numbers is recorded in a removable magazine, a latching arrangement to uniquely position the magazine relative to the dialer body when the dialer is operational. The latching arrangement includes complementary arcuate lips formed on the magazine and on the adjacent portions of the dialer body, together with a spring load latch, the arrangement being operative to simply and accurately position the magazine in the dialer.

This application is a continuation of my application Ser. No. 233,601, filed Oct. 29, 1962, now abandoned.

This invention relates to locating and securing means for removable plates and particularly means for use in machines wherein a plate fitting an opening in a machine wall or frame carries components for registry with other machine components wherein such registry must be secure and precise to insure proper operation of interrelated parts in the machine and on the plate.

The machine is described herein in its application to an automatic telephone dialing machine in which a tape bearing subscribers' names and coded telephone numbers is supported between storage spools so that it may be adjusted to present a subscriber's name to a viewing station and simultaneously the coded subscriber's number to a decoding station where the number is translated into impulses in a telephone circuit. It is desirable that the tape in its mounting or so-called magazine be readily removable for the purpose of typing names thereon or for replacement by a different tape. The precise position of the tape is critical with respect to the decoding mechanism of the machine and with tape adjusting means carried by the machine. The applicability of the invention to other environments will, however, be readily apparent from an understanding of the ensuing description.

It is the object of the invention to provide a locating and securing means for removable plates which is inexpensive to manufacture, simple to assemble and disassemble and capable of extreme precision in locating the plate in its assembled position.

Further objects and advantages of the invention and the manner in which it is carried into practice are made apparent in the following specification by reference to the accompanying drawing.

Figure 1:
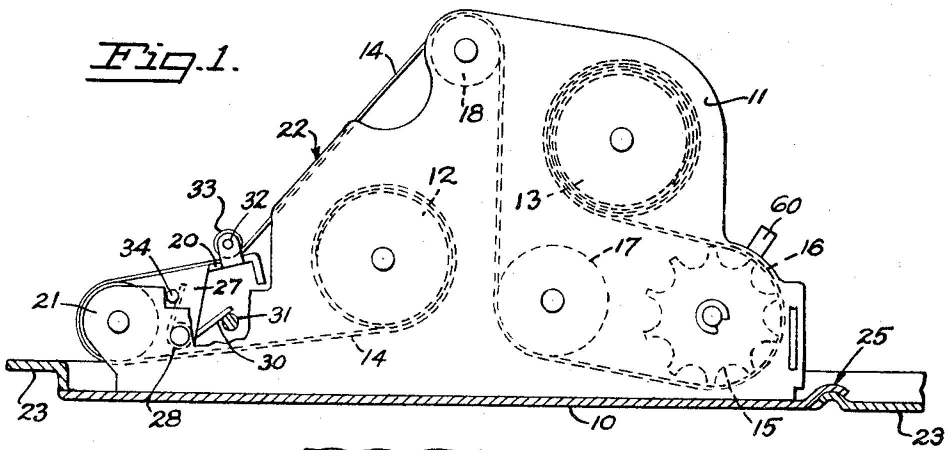
FIG. 1 is a view in side elevation with parts broken away and parts in section of a tape magazine shown as secured in position on the bottom plate or wall of an automatic dialing machine.

While the locating and securing means of the present invention is not restricted in its use to telephone dialing machines, a brief description of the tape magazine illustrated in FIG. 1 will facilitate an understanding of the construction and operation of the invention presently to be described.

In FIG. 1, a base plate 10 is shown as supporting spaced frames, one of which is shown at 11 between which are mounted spools 12 and 13 upon which an elongated tape is wound, the tape being shown at 14. From the spool 13, the tape is trained over a fluted roller 15 to expose a portion of the tape as at 16 with a coded telephone number. This number may be encoded on the tape in spaced magnetized bits which are scanned and translated as impulses in a telephone circuit by a suitable transducer 60. From the fluted roller 15, the tape is trained over guide rolls 17 and 18 to present its opposite surface above a table 20 which facilitates the writing of a subscriber's name on the tape. When the tape is adjusted to bring the name, so written, into view at a station indicated by the arrow 22, the coded number on the tape corresponding to the name occupies the position 16. The tape is then further trained over a guide roll 21 from which it passes to spool 12. The tape is constantly tensioned by spring means in or adjacent to the spools 12 and 13 and may be adjusted from one subscriber's number to another by suitable means (not shown) contained within the machine for imparting rotation to the spools.

Figure 2:
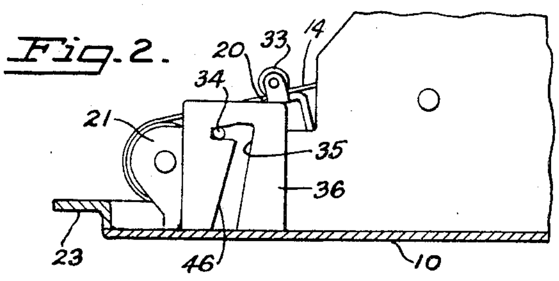
FIG. 2 is a fragmentary view illustrating locking means for securing the cartridge in position.

The entire magazine is secured and located with respect to the machine by interengagement with the bottom wall 23 of the machine through the locating and securing means of the present invention. At one end, the plate 10 is connected with the bottom wall 23 by spaced arcuate interlocking lips generally indicated at 25 in FIG. 1, presently to be described, and at the opposite end is latched in place by means associated with the table 20. This table includes a flat writing surface supported between a pair of downwardly extending brackets, one of which is shown at 27, pivotally supported on a shaft 28 and urged toward the normal position shown in FIG. 1 by a spring wound about a shaft 28 and having an end 30 bearing against a pin 31. The table also has a pair of upstanding gears 32 between which a small guide roller 33 is journaled for the purpose of retaining the tape in contact with the surface of the table. A pair of pins, one of which is shown at 34, extend outwardly from the brackets 27 and engage in angularly shaped slots 35, shown in FIG. 2 as formed in plates 36 which extend upwardly from the bottom wall 23 of the machine. The normal latched position of the pins 34 and the slots 35 is illustrated in FIG. 2 and when it is desired to move the plate 10 and its magazine from the machine, the guide roll 33 is pressed downwardly and rearwardly to rotate the table 20 about its supporting shaft 28 whereupon the pins 34 are free to move downwardly in the slots 35 permitting the entire plate to rotate about the axial center of the spaced arcuate interlocking lips 25.

Figure 3:
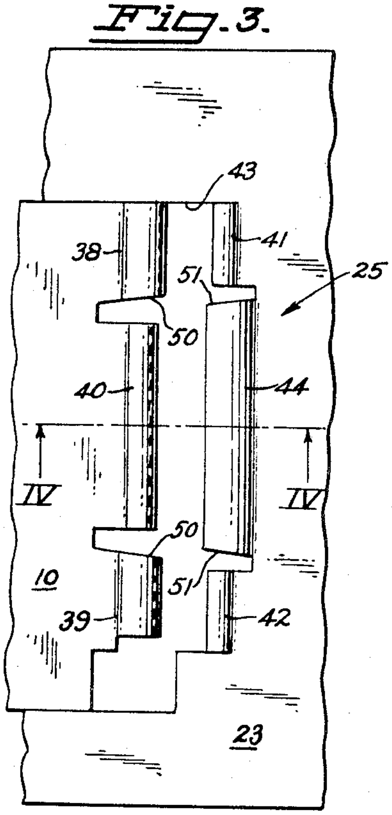
FIG. 3 is an enlarged fragmentary plan view of a portion of the plate and wall in spaced relationship illustrating the configuration of spaced arcuate interlocking lips on interengaging edges of the plate and wall.
Figure 4:
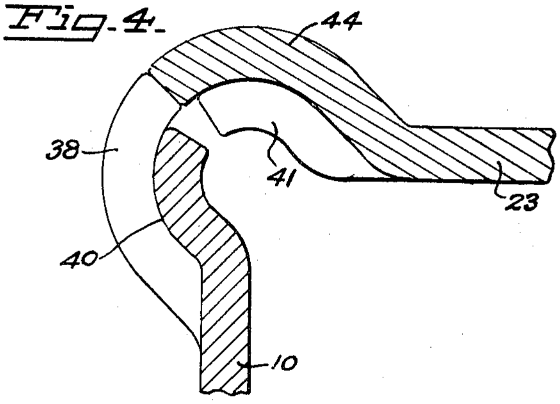
FIG. 4 is a greatly enlarged section on the line IV—IV of FIG. 3 illustrating the position of the interlocking lips just prior to assembly of the plate in the wall.

The lips 25 are shown in FIGS. 3 and 4 as comprising two large lips 38 and 39 on the plate 10 with a smaller lip 40 disposed between and spaced from them. The wall 23 has two small lips 41 and 42 adjacent the edges of an opening 43 into which the plate 10 fits. A large lip 44 is disposed between the lips 41 and 42. All of the lips are arcuate and formed on common centers with the outer surfaces of the small lips 40, 41 and 42 being formed on the same radius as the inner surfaces of the large lips 38, 39 and 44. Therefore to assemble the plate 10 in the wall 23, it is first disposed at right angles to the wall as shown in FIG. 4 and then swung upwardly about the axis of the lips through the position shown in FIG.

5 until it occupies the assembled position of FIG. 1 where the pins 34 have ridden up inclined edges 46 of the slots 35 and entered the confining upper edges of the slots under influence of the spring 30. Referring again to FIGS. 4 and 5, the manner in which the large lips on the plate 10 and the wall 23 pass over and become interlocked with the small lips upon swinging movement of the plate is apparent.

Figure 5:
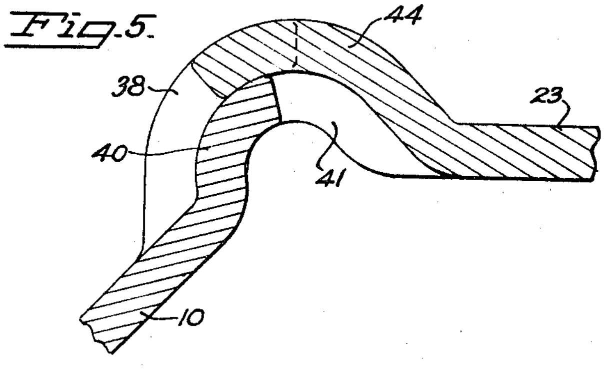
FIG. 5 is a view like FIG. 4 but illustrating the plate as moved toward its finally assembled position.

In FIG. 3, the arcuate lips on the plate and wall are shown as separated by notches having interengaging inclined edges 50 on the plate and 51 on the wall which come together with a camming or wedging action precisely and positively locating the plates against lateral displacement after assembly. The interengagement of the large and small lips as illustrated in FIGS. 4 and 5 precisely locate the plate against vertical and longitudinal displacement. Since all of the lips are made by a simple die forming operation, precision is insured which enables any plate and cartridge to be readily and accurately associated with any machine insuring proper relationship of interrelated and interengaging machine and magazine parts.

What is claimed is:

1. In a repertory dialer having a magnetic transducer and a removable magazine for a tape-like magnetic record medium, positioning means for such magazine to ensure unique positioning of such record medium relative to such transducer, such means comprising:

(a) a first and a second projection affixed to the repertory dialer, each such projection having an inclined surface;

(b) a third and a fourth projection affixed to the removable magazine, the third projection having an inclined surface complementary to the inclined surface of the first projection and the fourth projection having an inclined surface complementary to the inclined surface of the second projection; and (c) a latch, one element of which is affixed to the repertory dialer and one element of which is affixed to the removable magazine to lock such magazine in place relative to the repertory dialer when the first and third, and the second and fourth, projections are mated, thereby uniquely to position the tape-like record medium relative to the magnetic transducer.

2. In a repertory dialer, positioning means as in claim 1 wherein:

(a) the first, second, third and fourth projections are interleaved arcuate hinge sections; and (b) the inclined surfaces are formed on the sides of such hinge sections.

3. In a repertory dialer, positioning means as in claim 2 wherein the element of the latch affixed to the removable magazine is pivotably mounted and, further, is formed with an integral extension plate passing under the tape-like record medium, to serve as a writing platen when the removable magazine is in place in the repertory dialer.

References Cited

UNITED STATES PATENTS

| | | | |
|---|---|---|---|
| 3,104,287 | 9/1963 | Kobler | 179—90 |
| 2,953,647 | 9/1960 | Johanson | 179—90 |
| 2,618,809 | 11/1952 | Rubinoff | 16—172 |
| 1,566,236 | 12/1925 | Skurdal | 16—172 |

BERNARD KONICK, *Primary Examiner.*

A. I. NEUSTADT, *Assistant Examiner.*